UNITED STATES PATENT OFFICE.

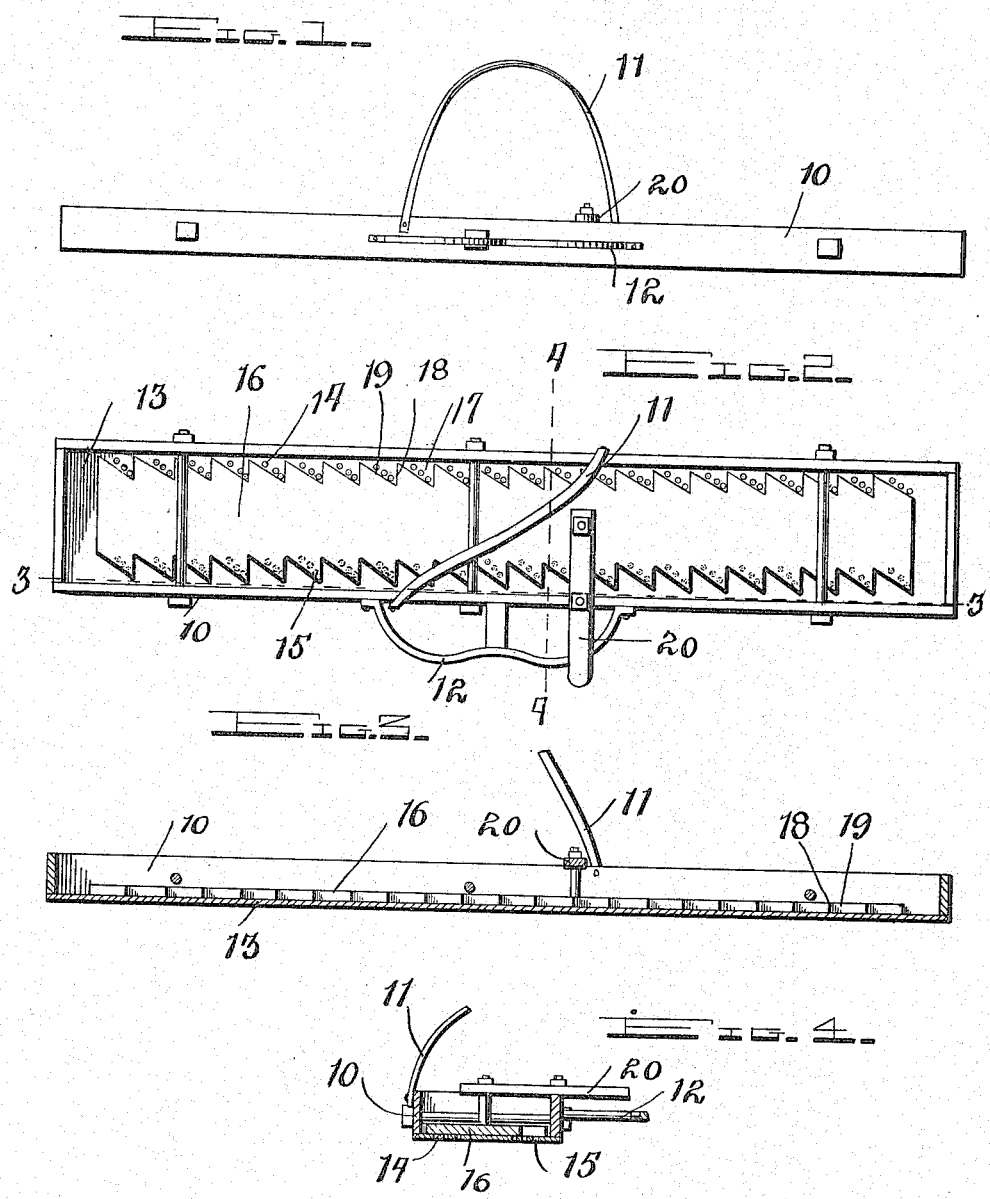

LEON E. DESPRES, OF MARLBORO, NEW HAMPSHIRE, AND JOSEPH DESPRES, OF MARLBORO, MASSACHUSETTS.

SEED-SOWER.

1,129,962.    Specification of Letters Patent.    Patented Mar. 2, 1915.

Application filed January 31, 1913. Serial No. 745,484.

*To all whom it may concern:*

Be it known that we, LEON E. DESPRES and JOSEPH DESPRES, citizens of the United States, residing at Marlboro and Marlboro, in the counties of Cheshire and Middlesex, States of New Hampshire and Massachusetts, respectively, have invented certain new and useful Improvements in Seed-Sowers; and we do hereby declare the following to be a full, clear, and exact description of the invention, such as will enable others skilled in the art to which it appertains to make and use the same.

This invention relates to improvements in seeding machines, and particularly to broadcast seed sowers.

The principal object of the present invention is to provide a simple construction of device of this character whereby the greatest amount of seed can be delivered in the most efficient manner.

Another object is to provide a device of this character in which complete control of the delivery of seed is obtained.

Other objects and advantages will be apparent from the following description, and with particular reference to the accompanying drawing.

In the drawing: Figure 1 is an elevation of the seed sower, Fig. 2 is a plan view of the same, Fig. 3 is a longitudinal sectional view on the line 3—3 of Fig. 2, and Fig. 4 is a transverse sectional view on the line 4—4 of Fig. 2.

Referring particularly to the accompanying drawing 10 represents an elongated seed box, which is adapted to be strapped to the body of the user by the harness 11, brackets 12 being carried by the box for engagement against the body of the user to hold the box away from him.

The bottom of the box is formed of a sheet of zinc or other suitable material, as indicated at 13, this bottom having a plurality of seed outlet openings 14 and 15. These openings are arranged near the long edges of the bottom in parallel series obliquely across the box.

Arranged on the bottom, and slidable longitudinally within the box is a controlling slide 16. This slide has formed in the side walls the recesses or notches 18. One wall of each of these notches is straight, while the other is inclined as at 19, this inclined wall being parallel with the oblique lines of openings, and adapted to move over them to cover or uncover them simultaneously.

Pivotally mounted on the box, and suitably connected to the slide 16, is a hand lever 20, by means of which the operator can reciprocate the slide to cover and uncover the openings, and control the delivery of seed therethrough.

Particular attention is called to the fact that when the openings in one edge of the plate are open, the openings in the other edge of the plate are closed. In this way the seed is agitated and delivered during each half of the reciprocation of the slide.

When the operator wishes to sow the seed thickly, he walks slowly and reciprocates the slide quickly, and when he wishes to sow thinly, he walks fast, and reciprocates the slide slowly.

From the foregoing it will readily be seen that perfect control of the delivery of seed is obtained. When it is desired to sow larger seed, it will of course be understood that a plate having larger openings can be substituted for the one in the bottom of the box.

What is claimed is:

A broadcast seed sowing machine comprising an elongated box for suspension from the body of the operator, a bottom in the box provided with a longitudinal series of seed outlet openings adjacent each long side of the box, said series of openings each consisting of a plurality of groups arranged in parallel lines obliquely across the box, and a hand operated slide movable longitudinally on the bottom of the box, the side walls of said slide being formed with notches having straight and oblique walls, the oblique walls being arranged in parallel relation with the lines of openings, the seed outlet openings and the inclined walls of the notches being so arranged that the groups of openings of the series at one side of the box are covered when the groups of openings of the series at the other side of the box are uncovered.

In testimony whereof, we affix our signatures in the presence of two witnesses.

LEON E. DESPRES.
JOSEPH DESPRES.

Witnesses:
P. H. FAULKNER,
MARGARET M. SHEA.

Copies of this patent may be obtained for five cents each, by addressing the "Commissioner of Patents, Washington, D. C."